United States Patent

[11] 3,582,615

[72] Inventors Heinz Schippers;
Gerhard Martens, both of Remscheid-Lennep, Germany
[21] Appl. No. 885,899
[22] Filed Dec. 17, 1969
[45] Patented June 1, 1971
[73] Assignee Barmag Barmer Maschinenfabrik AG. Wuppertal, Germany
[32] Priority Dec. 24, 1968
[33] Germany
[31] 1,816,935

[54] ARRANGEMENT FOR REGULATING THE SURFACE TEMPERATURE OF SEVERAL SIMILAR HEATED DEVICES
7 Claims, 4 Drawing Figs.
[52] U.S. Cl.................................................... 219/471, 219/469
[51] Int. Cl..................................................... H05b 1/02

[50] Field of Search............................................ 219/469, 471, 497

[56] References Cited
UNITED STATES PATENTS
3,435,171 3/1969 Lohest.......................... 219/471

Primary Examiner—Bernard A. Gilheany
Assistant Examiner—F. E. Bell
Attorney—Johnston, Root, O'Keeffe, Keil, Thompson & Shurtleff ABSTRACT: An apparatus for regulating the surface temperature of a plurality of revolving and substantially identically constructed and arranged heated devices, such as godets or thread rollers in textile machines, wherein a guide or monitor godet is provided in which two means of detecting and transmitting temperature data are used in conjunction with each other as a reference for effectively controlling the surface temperature of all other heated godets in the system.

INVENTORS:
HEINZ SCHIPPERS
GERHARD MARTENS
BY: Johnston, Root, O'Keeffe, Keil, Thompson, Shurtleff
ATT'YS

INVENTORS
HEINZ SCHIPPERS
GERHARD MARTENS

ARRANGEMENT FOR REGULATING THE SURFACE TEMPERATURE OF SEVERAL SIMILAR HEATED DEVICES

The present invention relates to apparatus for regulating the surface temperature of several revolving and similarly constructed and arranged heated devices, such as godets in textile machines.

With godets, as with numerous other rotatable devices for the heating of threads, yarns, filaments, ribbons, strips or the like, it is necessary to adjust the surface temperature of the heated device in contact with the thread to a predetermined value. This value must be maintained as constant as possible, irrespective of the variable conditions occurring at the thread-contacting surface of the device which affect the rate of heat transfer from the surface to the threads and the surrounding air. The combination of the thread's running speed and thickness can alter the magnitude of the mass to be heated per unit of time, so that the quantum of heat required to maintain a selected temperature value can vary appreciably.

In one known system for controlling the heat supplied to the individual godets there is installed in each revolving and heated godet a heat sensor which detects or measures the surface temperature of the godet. This value is transmitted to a regulator, which in turn is connected to a heating and switching circuit. The transmission of the signal detected by the heat sensor from the revolving godet to the stationary regulator occurs either by conduction through slip rings and brushes or by induction through use of induction coils. The slip ring arrangement has the disadvantages of corrosion, contamination, and wear at the points of contact between the moving parts, all of which affect the resistance of the circuit and thus the accuracy of the regulating operation. The arrangement whereby induction is used for the transmission of the sensor signal, on the other hand, requires a technically more complex circuit. In most of these circuits used for temperature detection, it is necessary to convert the signal into an alternating current. Further, in most circuits two coils are required, one for supplying a base signal and one for supplying another signal as modified by the heat sensor. Devices of this type are described in German Pat. No. 1,223,029.

To avoid the disadvantages inherent in the system of signal transmission from an embedded heat sensor, rotating with the heated godet, to a stationary regulator, it is a known practice to cut an annular groove in the revolving cylindrical wall of the heated godet, which annular groove runs coaxially to the axis of rotation. Inserted in the void or gap space formed by the groove is a stationary heat sensor. This sensor also detects a temperature which corresponds to the surface temperature of the rotating godet, although this is accomplished primarily by convection through the air present in the annular groove rather than by conduction from the wall directly to the heat sensor. As a consequence, the heat transfer to the measuring sensor depends on the speed of the revolving godet. Such devices are described in German Pat. No. 1,957,805 (utility model).

There now exists the need for an arrangement or combination of elements that will regulate the surface temperature of a large number of revolving and similarly constructed and arranged heated godets. It is desirable when using the stationary sensor system to avoid fluctuations in the heated godet surface temperature due to its speed of revolution; and on the other hand, it is also desirable to reduce the expenditure required in the transmission of the signal from the coturning embedded heat sensor, i.e., in the rotating system, to the stationary temperature-regulating elements. This expenditure is not only an economic problem, the cost of the machine being greatly increased, but also a technical problem. For example, in a textile machine with 160 or more godets, considerable space is required where each godet is accompanied by a signal transmission system of its own.

It is an object of the invention to overcome the above described cost and space problem by having only a few but at least one of the heated godets serve as a guide or monitoring device.

Other objects will become apparent to those skilled in the art from the following description of the invention.

In the subject invention a guide godet is equipped with both a revolving heat sensor and a stationary heat sensor. The rotating sensor is permanently embedded in the wall of the rotating godet, as a result of which it detects the surface temperature by good heat conduction through the wall. The stationary sensor is mounted in the proximity of the wall but not in direct contact with it. All other godets have only the stationary sensor mounted on each in the proximity of the wall, in the same relative position as in the guide godet.

In this system, these stationary heat sensors are each connected to a regulator. All such regulators are connected to an adjustable reference, controlled by the stationary sensor of the guide godet. The regulators control the heating circuits of the godets through a switching means in each circuit. The stationary sensor system assures an accurate transmission of the true surface temperature of each godet. By use of the embedded heat sensor additionally in the guide device, a measurement is transmitted independent of the stationary sensor. This double measurement in the guide device makes it possible to compensate for a difference in the signals when those signals from other godets, affected by the revolving speed, differ from the signal of the embedded sensor in the guide godet, since for the same operating conditions, the difference in signals will be experienced between the two sensors of the guide godet also. In this manner, the surface temperature of the other devices is controlled with the accuracy corresponding to that of the guide godet. It is desirable that all godets in the system function under the same operating conditions and that all stationary sensors, including that of the guide device, be mounted in exactly the same manner and position with respect to the godet walls.

In a further embodiment of the invention, it is proposed that the regulators for the godets equipped exclusively with the stationary heat sensors be connected by a double-throw switching means to either the adjustable reference controlled by the stationary sensor of the guide godet or, in the alternate, to a manually controlled, adjustable reference. This permits the guide godet rotating sensor to be called upon for correction of the stationary sensors only when the operating state of the whole machine is to change, such as when starting, stopping or switching to a new running speed. By use of such double-throw switching means, when the thermal equilibrium of the machine has been reached, the correction of the surface temperatures by the guide godet can be dispensed with and the surface temperatures merely compared with a set, predetermined value. Hereby, the possibility is appreciably diminished that the guide godet will incorrectly influence the temperature of all other godets during the entire operating time of the machine if the guide godet itself contains an error.

The double-throw switching means can be accomplished by use of either a manually operated switch or an electrically or electronically controlled relay. If a relay is used, an adjustable timing device can be included in the circuit which will permit the automatic transfer of the regulators from the control of the guide godet to that of the predetermined reference at the expiration of a time shown by experience to be optimum for the machine reaching temperature equilibrium.

It is also possible for the relay to be connected to a signal-comparing device which will cause the transfer of references when the difference between the two signals delivered by these references becomes less than a predetermined value, which itself can be adjusted according to the regulating precision desired.

Finally, it also possible for the predetermined value reference to be connected to a readjusting device which will readjust the desired value automatically by dependence upon the value determined by the stationary sensor of the guide godet. Such a readjustment is advantageous when first setting the textile machine in operation with a new type of thread, since the optimum temperature for that thread is not known until a history of operating conditions is established for it. In such a situation, it suffices to set the predetermined reference in advance at an estimated optimum temperature and thereafter to permit a readjustment with the aid of the values determined in the guide device.

To assure that the apparatus proposed operates with sufficient accuracy, it is preferred to arrange the stationary sensors in the same relative position on each godet. It is of no major significance whether proximity to the surface is understood to mean outside the godet wall or, which as a rule is more advantageous, in a groove or recess cut in the godet wall and concentrically surrounding its axis of rotation. If the annular groove or recess is selected, it is necessary to use a correspondingly grooved or recessed guide godet. Thus, the guide godet will contain both a stationary heat sensor as just described and a permanently embedded heat sensor connected either conductively by slip rings and brushes or inductively by induction coils to the basic measuring and regulating circuit.

The invention is explained in detail with the aid of the following drawings in which FIG. 1 is a block circuit diagram of the arrangement according to the invention;

Figure 1:
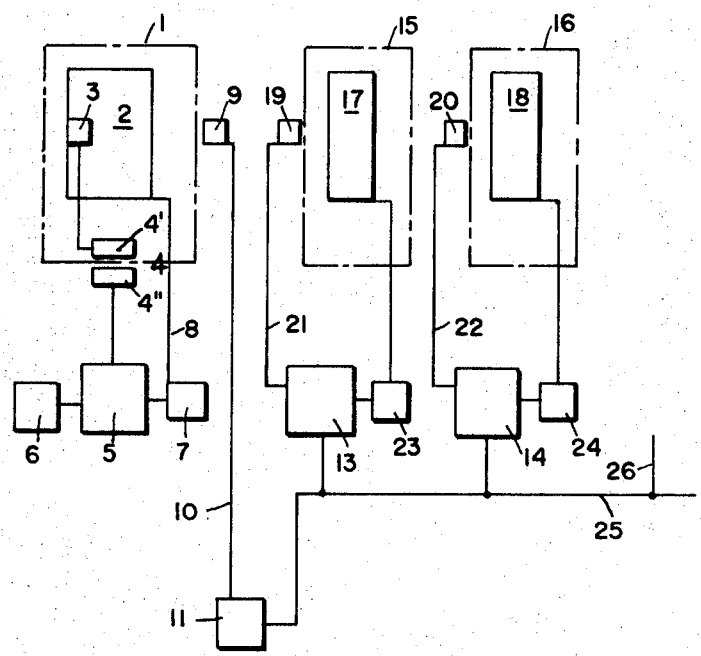
Figure 4:
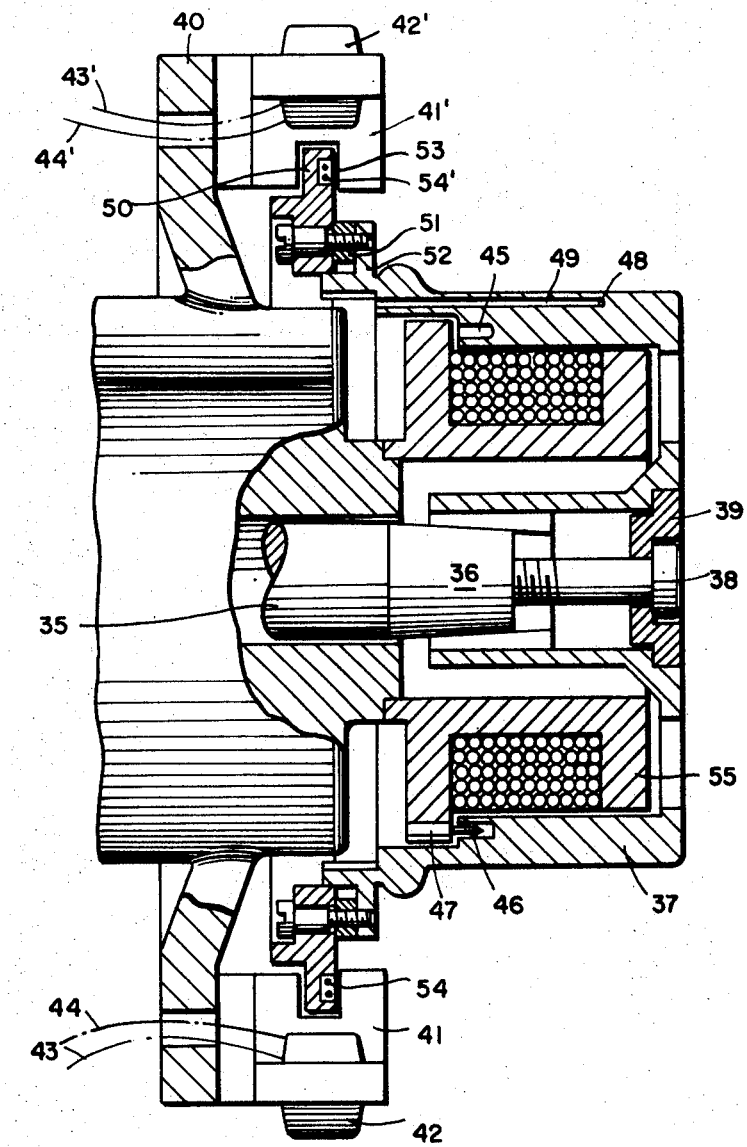
FIG. 4 is a longitudinal section of a monitor godet constructed according to the invention.

In FIG. 1 the guide or control godet 1 is only schematically indicated, further details of a preferred construction of this godet being shown in FIG. 4. The control device consists essentially of the heated portion 2, in the wall of which there is fixed or embedded a heat sensor 3. The heat sensor 3 is connected to a signal-transmitting device 4, which can consist of two coils 4' and 4'' arranged opposite one another or of slip rings and slip brushes (not shown). The device 4 transmits the signal detected by the heat sensor 3 to a regulating device 5. This device is connected to the basic adjustable reference 6. If a difference exists between the desired value established at this reference and the signal detected by the sensor 3, such that the sensor signal is less than that required by the basic adjustable reference 6, then the basic regulating device 5, connected to the switch 7, causes the switch 7 to turn on the heating current until this difference disappears. The heat energy can be supplied to the device either inductively or conductively, as is represented schematically by line 8.

Also on the control godet 1, in addition to the embedded heat sensor 3, is a stationary heat sensor 9, which is situated in an annular groove or other air space in proximity to the heated wall of the control godet. This stationary heat sensor 9, which does not rotate with the godet, is connected by line 10 to the guide-controlled reference 11, which in turn is connected to and controls regulating devices 13, 14, etc.

Two other heated godets or similar heated devices are represented at 15 and 16, it being understood that a large number of godets can be connected in this same system. They include heated godet walls 17 and 18 as well as the stationary heat sensors 19 and 20 respectively associated with each godet. These heat sensors are connected by lines 21 and 22 to the regulating devices 13 and 14, respectively. These regulators compare the signals transmitted by the heat sensors 19 and 20 to the signal established by the guide-controlled reference 11. Regulating devices 13 and 14, connected to switching devices 23 and 24, will switch on the respective heating current circuits if the signal transmitted by the heat sensors 19 and 20 correspond to a lower temperature value than is prescribed by the guide-controlled reference 11, under the control of stationary heat sensor 9 of the guide godet 1. This system assures that the heated godets 15 and 16 are regulated to the same surface temperature as the monitor godet 1. As many further godets as desired can be connected to line 25 from the guide-controlled reference 11, as is schematically indicated at 26.

Figure 2:
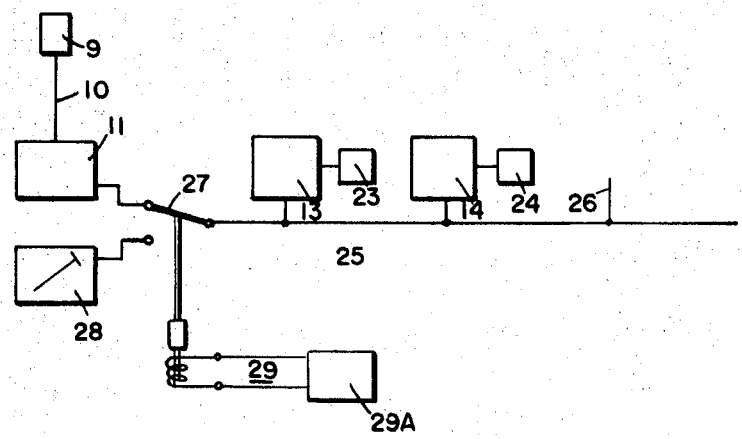
FIGS. 2 and 3 are modifications of the block circuit diagram.

In FIG. 2 a variation of the FIG. 1 diagram is schematically indicated in which the guide-controlled reference 11 is connected by means of a double-throw switch 27 to the distributing line 25. This double-throw switch 27 makes it possible to connect the distributing line 25 to the manually adjustable standard reference 28, instead of the guide-controlled reference 11 influenced by the guide godet stationary heat sensor 9. This ability to transfer references has the advantage that after the machine reaches temperature equilibrium, the control can be taken over by the standard reference, whereby disturbances possibly occurring in the guide godet 1 do not further influence the temperature of the other heated godets. The double-throw switch 27 can be either a manually operated switch or an electrically or electronically controlled relay. The relay is schematically indicated at 29, wherein the double-throw switch 17 becomes an integral part (the contacts) of the relay 29. An adjustable timing device 29A can be included in the control circuit of the relay to provide for automatic transfer of the references at the expiration of a predetermined period.

Figure 3:
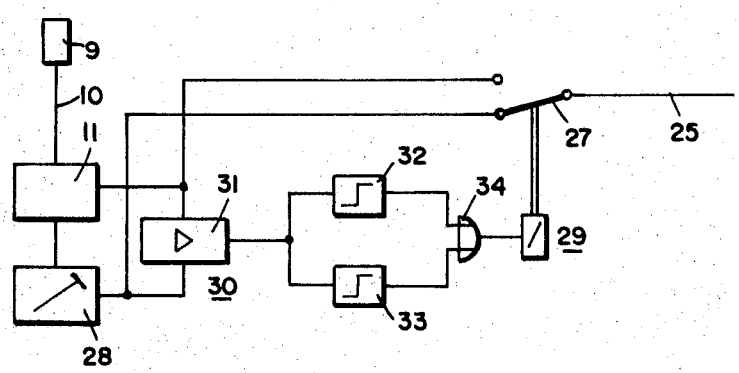

In a further development of the invention, illustrated in FIG. 3, it is proposed that the relay 29, operating the double-throw contacts 27, be connected to a signal-comparing device 30, which will cause the transfer of line 25 from reference 11 to reference 28 when the difference between the two signals delivered by these two references becomes less than a predetermined value. This value is manually adjustable and is dependent on the desired precision of regulation. This automatic transfer can be accomplished by feeding the signals from the two references 11 and 28 to a differential amplifier 31 to which is connected a threshold value switch consisting of the two polarized switching stages 32 and 33. These switching stages are connected to an OR gate 34. When the signal from the differential amplifier is in the threshold and polarity of either switching stage 32 or 33, the OR gate will be turned on and the coil of relay 29 will be energized. FIG. 3 illustrates the contacts 27 when the relay 29 is energized, whereas FIG. 2 represents the contacts 27 when the relay is in its normal (deenergized) condition.

Illustrated in FIG. 4 is a guide godet, constructed for use according to the invention. Beginning at the center of the drawing, the drive shaft 35 is illustrated, on the truncated conical end 36 of which are attached the turning parts of the device, in particular, the godet (thread roller) 37. To attach the godet 37, a screw or bolt 38 is screwed into the threaded inner bore of the conical shaft end 36 with washer 39 interpositioned between the screw or bolt head 38 and the godet 37.

The stationary base plate 40, which does not rotate with the godet, is attached to the machine frame by any suitable means, such as screws or bolts (not shown). The baseplate 40 holds two coil forms 41 and 41' with the coils 42 and 42' respectively carried therein. The respective coil leads 43, 44 and 43', 44' are connected to the basic regulating device 5, shown in FIG. 1.

Cut in the body wall of the godet 37 is a U-shaped groove 45 arranged concentrically to the axis of rotation of the godet. Into this groove is inserted a stationary heat sensor 46, which is rigidly seated at 47 in the flange of the stationary coil form 55 of the induction heating device. The stationary heat sensors for each of the other godets are mounted at exactly the same position and in the same manner as in this guide godet.

In addition to the stationary sensor, two bores are made into the body wall of the godet 37 for the embedded heat sensors which revolve with the godet. One such bore is illustrated in the drawing at 48 and its corresponding heat sensor is 49. The bore 48 extends inward deeper than does the annular groove 45 for the stationary heat sensor 46. A thermistor, thermocouple or any equivalent device responsive to changes in temperature can be used as the heat sensors. The embedded heat sensors 49 are connected to ring 50 which is attached by means of screws or bolts to the godet collar 52 with the interposition of an annular layer of insulating material 51. This assembly rotates with the godet. In the ring 50 is a depression 53 in which are found two other coils 54 and 54'. Additional switching elements required for the transmission of temperature data in a particular circuit arrangement selected can be mounted in a suitable location on ring 50.

The drawing further illustrates that the rotating ring 50 is positioned concentrically with the stationary yoke-shaped extensions of coil forms 41 and 41' so as to avoid contact therewith. These parts together serve as a transmission device for the temperature data.

The guide godet set forth in FIG. 4 is only one example of suitable means for transmitting temperature data. Within the scope of the invention, it is possible to transmit temperature data in another manner or to replace the particular heat sensor rotating with the godet by other suitable sensors.

We claim:

1. In a textile machine having a plurality of revolving heated godets of substantially identical wall construction and having substantially identical rotatable heating means for heating a plurality of threads or the like in running contact on the surface of each godet, the improvement for accurately controlling the temperature of the thread-contacting surfaces of all of said godets in a common system which comprises:
    a. at least one monitor godet containing a first heat sensor embedded in the wall of the godet and rotating therewith and embedded in the wall of the godet and rotating therewith and a stationary heat sensor mounted in proximity to the heated thread-contacting wall surface of the monitor godet;
    b. a plurality of other godets in a common system with said monitor godet, said other godets containing a stationary heat sensor mounted in proximity to the heated thread-contacting surface of the godet wall in substantially the same position as said stationary heat sensor of said monitor godet;
    c. an electrical heating means in each of said monitor godet and said other godets to supply heat to the thread-contacting surfaces of said godets;
    d. a preset temperature reference means;
    e. a first regulator means responsive to said embedded heat sensor of the monitor godet and to said preset temperature reference means to regulate the amount of heat supplied to the thread-contacting surface of said monitor godet through its heating means;
    f. a second reference means responsive to said stationary heat sensor of the monitor godet; and
    g. a second regulator means for all other godets responsive to said second reference means to regulate the supply of heat to the thread-contacting surface of all of the other godets through their individual heating means.

2. An improved textile machine as in claim 1, wherein said second regulator means includes a series of regulators, said regulators being connected by means of a double-throw switch either to said second reference means or to a third adjustable reference, which can be manually set to a predetermined value.

3. An improved textile machine as in claim 2, wherein the double-throw switch is an electrically or electronically controlled relay.

4. An improved textile machine as in claim 3, wherein the double-throw switch is connected to an adjustable timing device.

5. An improved textile machine as in claim 3, wherein the double-throw switch is connected to a signal-comparing means which brings about the transfer from the godet-controlled adjustable reference, influenced by the monitor godet stationary heat sensor, to the predetermined value reference, when the difference between the two signals delivered by these references is less than a preset value, this value selected according to the precision of regulation desired.

6. An improved textile machine as in claim 5, wherein the predetermined reference is connected to a readjusting device which readjusts the predetermined reference value automatically, depending on the value determined by the heat sensor of the monitor godet.

7. A monitor godet for use in the machine of claim 1, wherein the embedded heat sensor which rotates with the godet is connected by slip rings and brushes or by induction coils to the remainder of the measuring and regulating circuit, and the stationary heat sensor is inserted into a U-shaped groove or recess cut in the godet wall, concentrically surrounding the axis of rotation of the heated godet.